(12) United States Patent
Rosell et al.

(10) Patent No.: US 12,187,493 B2
(45) Date of Patent: Jan. 7, 2025

(54) PACKAGE

(71) Applicant: BERRY SUPERFOS RANDERS A/S, Taastrup (DK)

(72) Inventors: Johan Rosell, Mullsjö (SE); Karl-Johan Lidbrandt, Mullsjö (SE); Robert Axell, Mullsjö (SE)

(73) Assignee: BERRY SUPERFOS RANDERS A/S, Taastrup (DK)

( * ) Notice: Subject to any disclaimer, the term of this patent is extended or adjusted under 35 U.S.C. 154(b) by 66 days.

(21) Appl. No.: 17/919,795

(22) PCT Filed: Aug. 31, 2020

(86) PCT No.: PCT/EP2020/074254
§ 371 (c)(1),
(2) Date: Oct. 19, 2022

(87) PCT Pub. No.: WO2021/213690
PCT Pub. Date: Oct. 28, 2021

(65) Prior Publication Data
US 2023/0192352 A1    Jun. 22, 2023

(30) Foreign Application Priority Data
Apr. 20, 2020 (GB) .................... 2005709

(51) Int. Cl.
*B65D 3/06* (2006.01)
*B65D 3/30* (2006.01)
*B29C 45/14* (2006.01)
(52) U.S. Cl.
CPC ............ *B65D 3/30* (2013.01); *B65D 3/06* (2013.01); *B29C 45/14467* (2013.01); *B29C 45/14475* (2013.01)

(58) Field of Classification Search
CPC . B65D 51/28; B65D 3/10; B65D 3/06; B65D 3/28; B65D 3/30; B29C 45/14467; B29C 45/14475; B29C 45/14778; B29C 2045/14473
USPC .......... 229/400, 4.5, 403, 406; 264/267, 268
See application file for complete search history.

(56) References Cited

U.S. PATENT DOCUMENTS

| | | | | |
|---|---|---|---|---|
| 3,931,385 A | * | 1/1976 | Sutch ............. | B29C 45/14475 264/154 |
| 4,001,471 A | * | 1/1977 | Rumball ............. | B65D 5/209 428/81 |
| 4,020,140 A | * | 4/1977 | Rumball ........... | B29C 45/14475 264/261 |

(Continued)

FOREIGN PATENT DOCUMENTS

| | | | | |
|---|---|---|---|---|
| CA | 2499766 C | * | 1/2007 | ............. A23G 9/503 |
| EP | 1650134 | | 4/2006 | |

(Continued)

OTHER PUBLICATIONS

International Search Report and Written Opinion for PCT/EP2020/074254 dated Feb. 9, 2021.

(Continued)

*Primary Examiner* — Nathan J Newhouse
*Assistant Examiner* — Phillip D Schmidt
(74) *Attorney, Agent, or Firm* — Barnes & Thornburg LLP (57) ABSTRACT

A package (10) is provided and comprise a frame (15) formed from a plastics material and a wall (20) formed from a paper or paper-based material.

20 Claims, 15 Drawing Sheets

(56) References Cited

U.S. PATENT DOCUMENTS

| | | | | |
|---|---|---|---|---|
| 4,123,214 A * | 10/1978 | Sutch | ................ | B29C 45/14475 |
| | | | | 249/91 |
| 4,993,623 A * | 2/1991 | Kelly | ..................... | B65D 15/08 |
| | | | | 229/110 |
| 7,481,356 B2 * | 1/2009 | Stahlecker | ............... | B65D 3/06 |
| | | | | 206/520 |
| 7,665,627 B2 * | 2/2010 | Shibata | .................... | B65D 3/06 |
| | | | | 220/703 |
| 9,302,832 B2 * | 4/2016 | Park | ....................... | B65D 15/08 |
| 10,589,890 B2 * | 3/2020 | Nille | ........................ | B65D 3/14 |
| 2012/0261464 A1 * | 10/2012 | Hung | ............... | B29C 45/14688 |
| | | | | 264/478 |
| 2014/0353202 A1 * | 12/2014 | Park | ....................... | B65D 15/08 |
| | | | | 206/524.6 |
| 2021/0261464 A1 | 8/2021 | Kerr et al. | | |

FOREIGN PATENT DOCUMENTS

| | | | | |
|---|---|---|---|---|
| EP | 1650134 A2 * | 4/2006 | ....... | B29C 45/14475 |
| EP | 2213350 | 8/2010 | | |
| EP | 2420374 | 2/2012 | | |
| GB | 1348370 | 3/1974 | | |
| JP | H1058482 A * | 3/1998 | | |
| WO | 20110131653 | 10/2011 | | |

OTHER PUBLICATIONS

International Preliminary Report on Patentability for PCT/EP2020/074254 dated Jul. 12, 2022.

* cited by examiner

Figure 34:
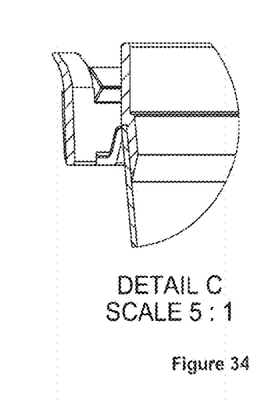
Figure 35:
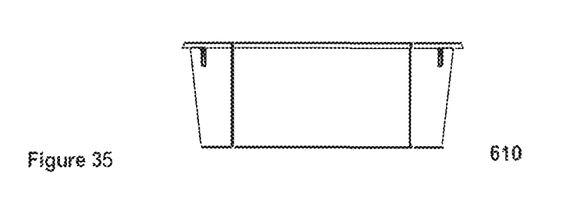
Figure 36:
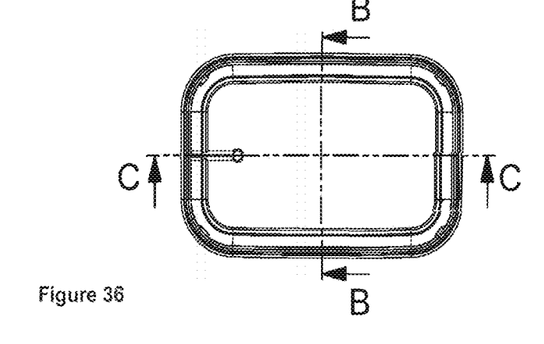

Figure 34
DETAIL C SCALE 5:1

Figure 32

Figure 33:
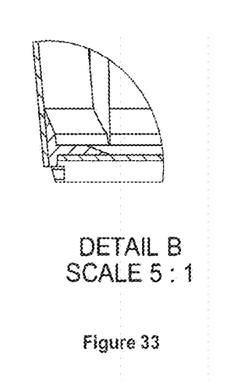

Figure 33
DETAIL B SCALE 5:1

Figure 29

Figure 30

Figure 31:
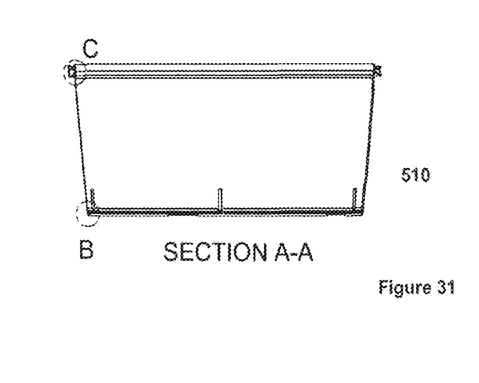
Figure 32:
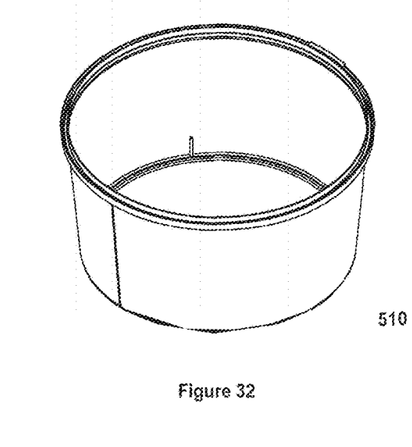

Figure 31
SECTION A-A

Figure 40:
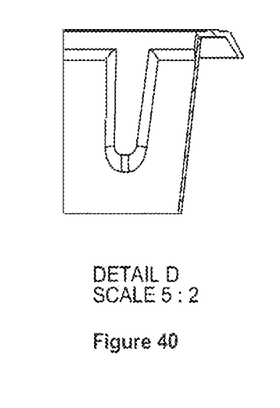
Figure 41:
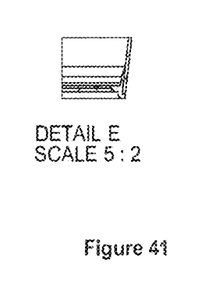

DETAIL D
SCALE 5:2
Figure 40

Figure 38

DETAIL E
SCALE 5:2

Figure 41

Figure 39:
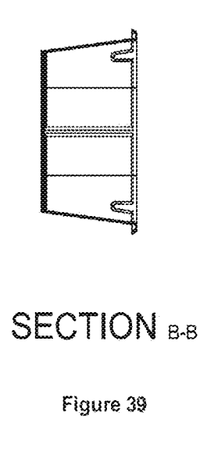

SECTION B-B
Figure 39

Figure 35

Figure 36

Figure 37:
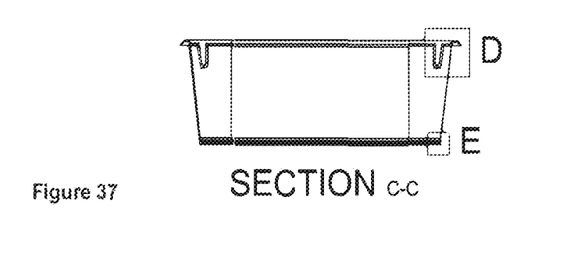
Figure 38:
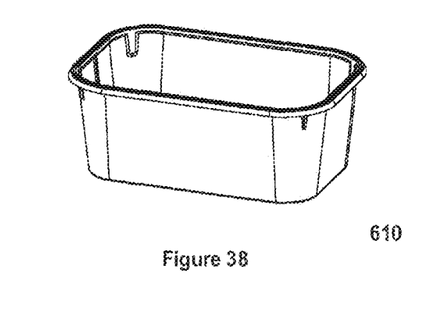

SECTION C-C
Figure 37

PACKAGE

CROSS REFERENCE TO RELATED APPLICATIONS

This application is a U.S. national stage application under 35 U.S.C. § 371 (b) of International Application No. PCT/EP2020/074254 filed Aug. 31, 2020, which claims priority to the United Kingdom Patent Application No. 2005709.7 filed on Apr. 2020, the disclosures of both of which are hereby expressly incorporated by reference in their entirety.

The present invention relates generally to packaging and particularly, although not exclusively, to a hybrid material package such as a jar, pot, cup or the like.

Use of more than one different type of material can be used to create packaging with multiple benefits, including benefits for performance and environmental impact.

The present invention seeks to provide improvements in or relating to packaging.

An aspect of the present invention provides a package comprising a frame formed from a plastics material and a wall formed from a paper or paper-based material.

This aspect therefore allows for the incorporation of paper into packaging.

The frame may be formed from a polyolefin polymer such as polypropylene.

The wall may, for example, be formed from paperboard or cardboard which may be lined or coated with plastic or wax. The paperboard/cardboard may be a laminate, for example including one or more layers of plastics material such as polypropylene.

The wall may be formed as side sleeve/wrap/wall.

The package further comprises a base, which may be formed separately from the wall. The base may be assembled during or after formation of a frame/wall sub-assembly.

The base may comprise paper or paper-based material and/or plastic material. In some embodiments a disc-like paperboard base is provided.

The package may comprise a lid. The lid may comprise paper or paper-based material and/or plastics material. In some embodiments the lid is formed from just plastics material. In some embodiments the lid is a hybrid material part such as a plastics/paperboard composite, for example formed by a sequential moulding process.

The frame (for example a lower ring) may include a foot on which the package rests in use. This can be useful during post-forming operations (such as filling) and in subsequent customer use to protect a paperboard base. The base is therefore at least slightly sunken from the bottom end of the frame so that it is raised from a surface when the package stands on the frame.

The foot may include one or more steps/ridges/ribs onto/against which a base may be received (for example being dropped in from above or pushed in from below).

In some embodiments a wall is overmoulded (for example injection moulded) onto a frame.

The frame may be formed using an off-centre injection point e.g. offset from a generally central axis of the frame.

The frame may be formed with an upper ring and a lower ring. The rings may be joined by a stem.

The lower ring may include a radially inwardly extending part that allows formation using an off-centre injection point.

The upper ring may have a larger diameter than the lower ring. In plan the rings may be concentric (i.e. share the same central axis). An axially inclined stem may join the rings together. Either or both rings may be substantially circular.

The wall may be generally frustoconical when assembled onto the frame.

The wall may be formed as a flat blank that is foldable into a final form.

A further aspect provides a mixed material package comprising an injection moulded polypropylene skeleton and a paperboard sleeve.

A package formed in accordance with the present invention may, for example, be a cup, pot or a jar.

A further aspect provides a method of forming a package comprising: providing a wall formed from a paper or paper-based material; inserting the wall into a mould; and injection overmoulding a frame onto the wall.

The mould may be configured such that when closed it presses onto the wall to define a boundary (for example a seal) for subsequent material flow during overmoulding.

In some embodiments a base is also inserted into the mould. The subsequent injection of the frame may join/link the base and wall together.

The material for the frame may be injected using an off-centre gate. The mould may be provided with a cavity that will form a projecting/extending limb on the frame which can serve as an injection gate.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims. Each aspect can be carried out independently of the other aspects or in combination with one or more of the other aspects.

The present invention will now be more particularly described, by way of example, with reference to the accompanying drawings.

Example embodiments are shown and described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The invention is not limited in the design and shape of the structure shown in the drawings.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Figure 1:
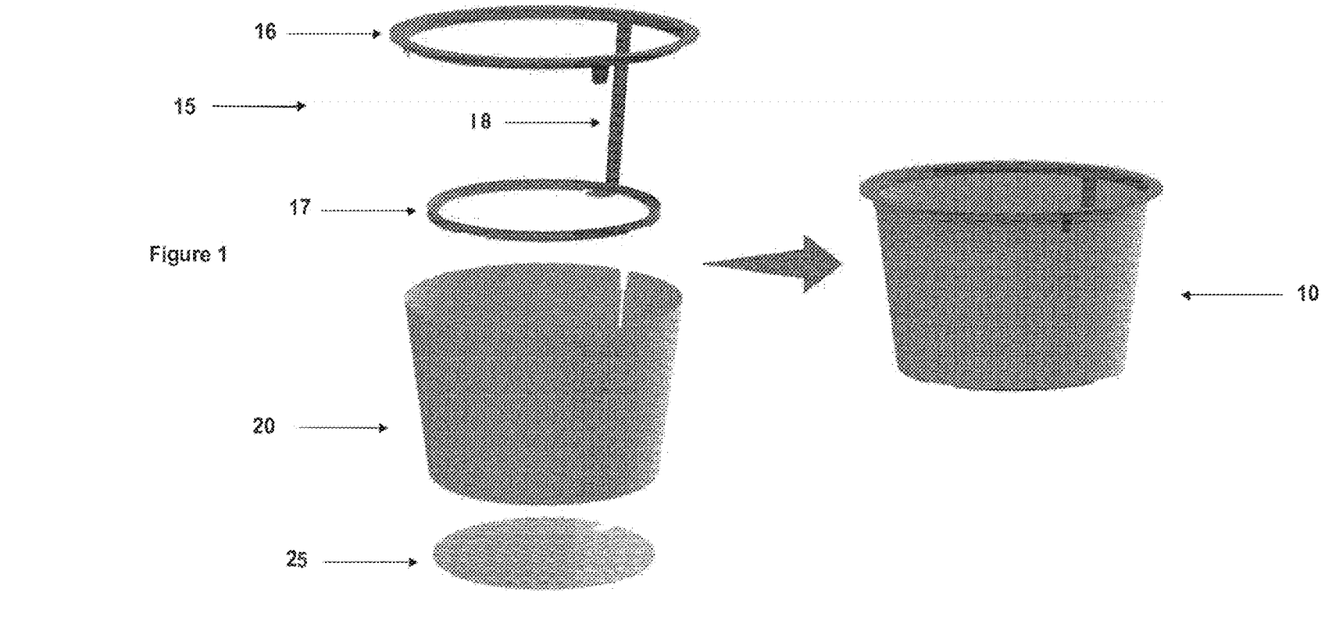

Referring now to FIG. 1 there is shown a package generally indicated 10. The exploded view shows the package 10 to comprise a frame 15, a wraparound sidewall 20 and a base 25.

The frame comprises an upper ring 16 and a lower ring 17 which are axially spaced and joined by an inclined stem/tether 18. The upper ring includes depending tab which in use form around notches formed in the sidewall.

Figure 2:
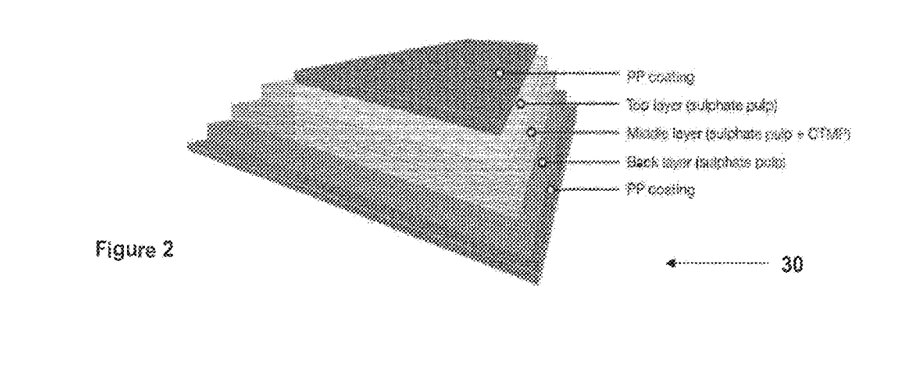

FIG. 2 shows a partial section of the paperboard material used in this embodiment for the sidewall 20 and the base 25.

Figure 3:
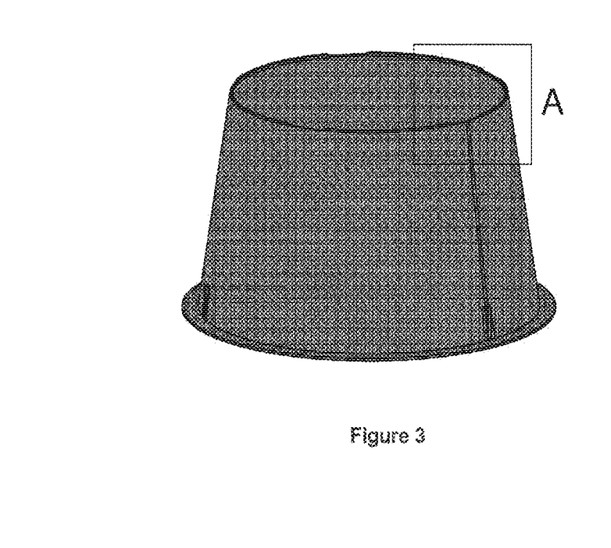
Figure 4:
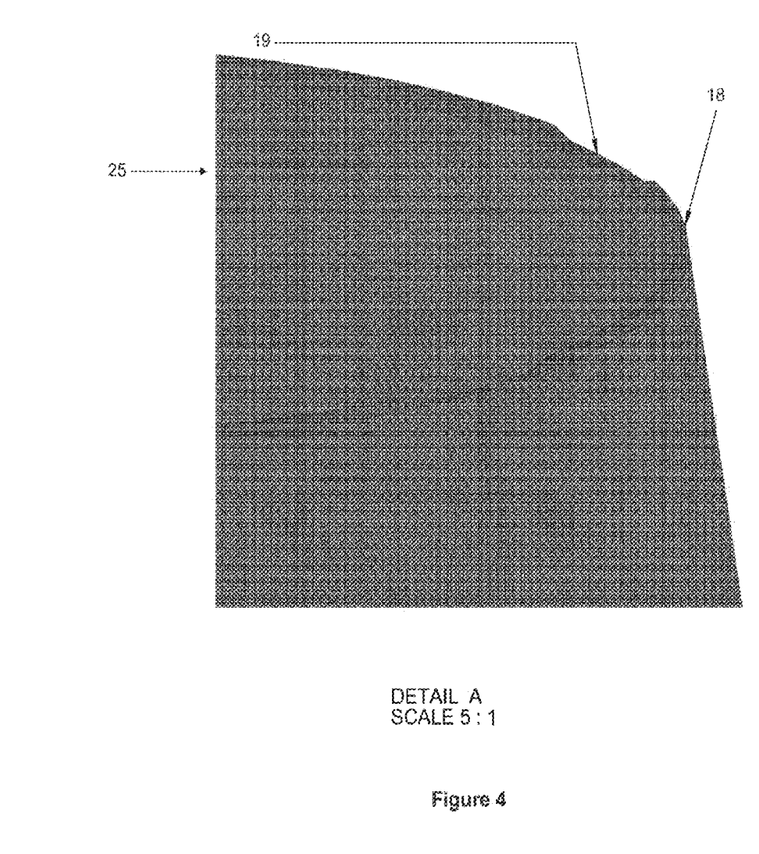

FIGS. 3 and 4 illustrates the lower ring 17 and shows that at its "bottom" face (i.e. the face on which the package will rest in use) a foot is formed by arcuate feet portions 18. The portions 18 are spaced by radially inwardly extending rims 19 on which the base 25 rests in the package. The foot protects the paperboard base against damage (wear and water damage) during filling and subsequent usage.

Figure 5:
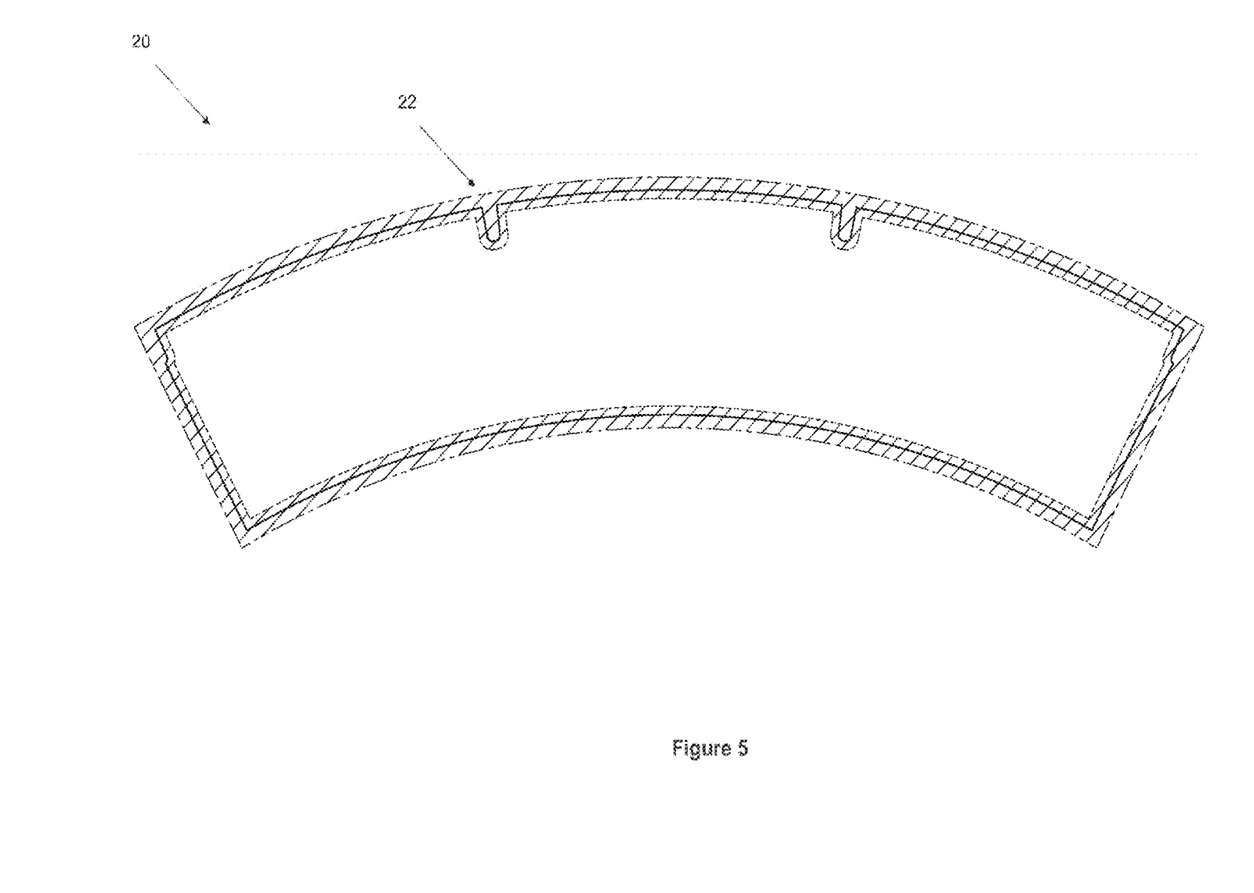

FIG. 5 shows a blank used to form the sidewall 20. A punch line is shown in solid line. The blank is generally arcuate and includes two notches 22.

Figure 6:
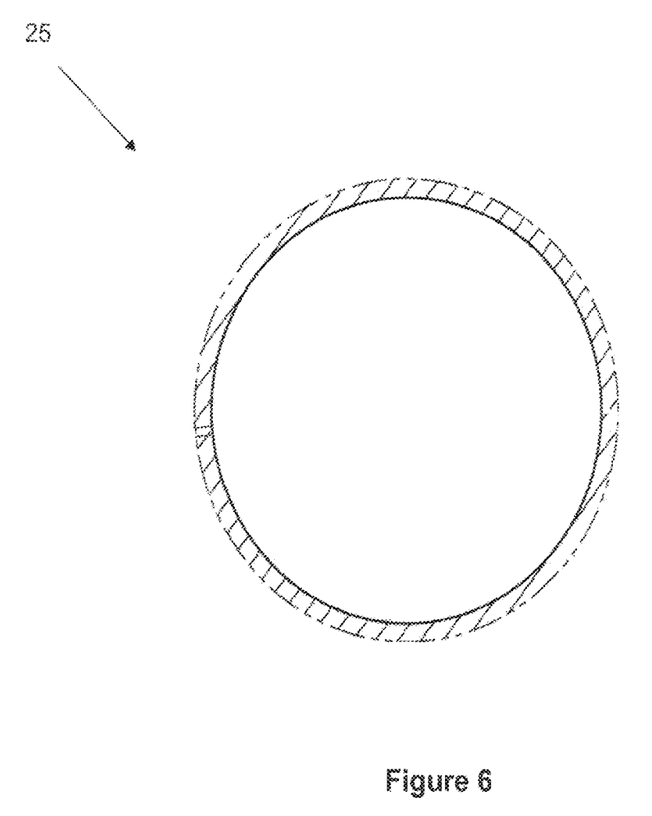

FIG. 6 shows a blank used to form the base 25. A punch line is shown in solid line.

Figure 7:
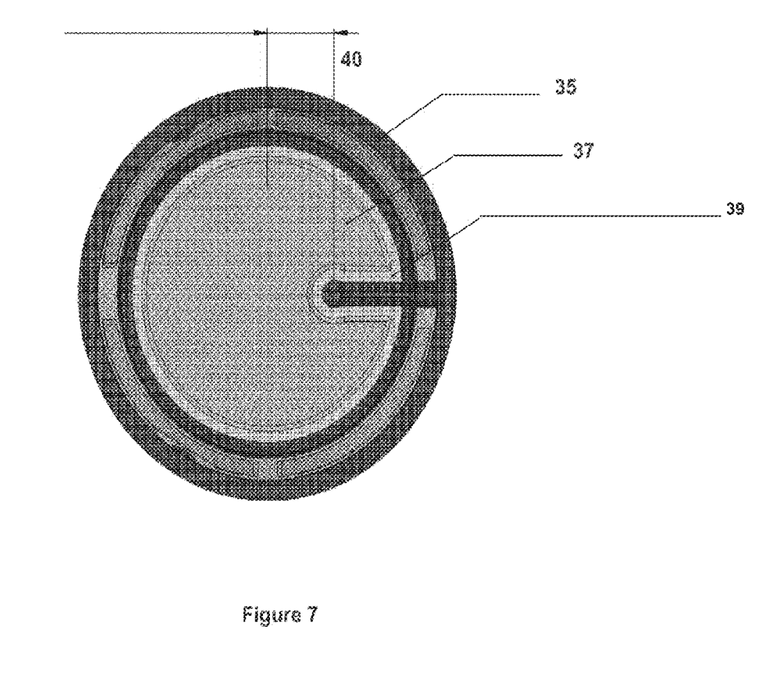
Figure 8:
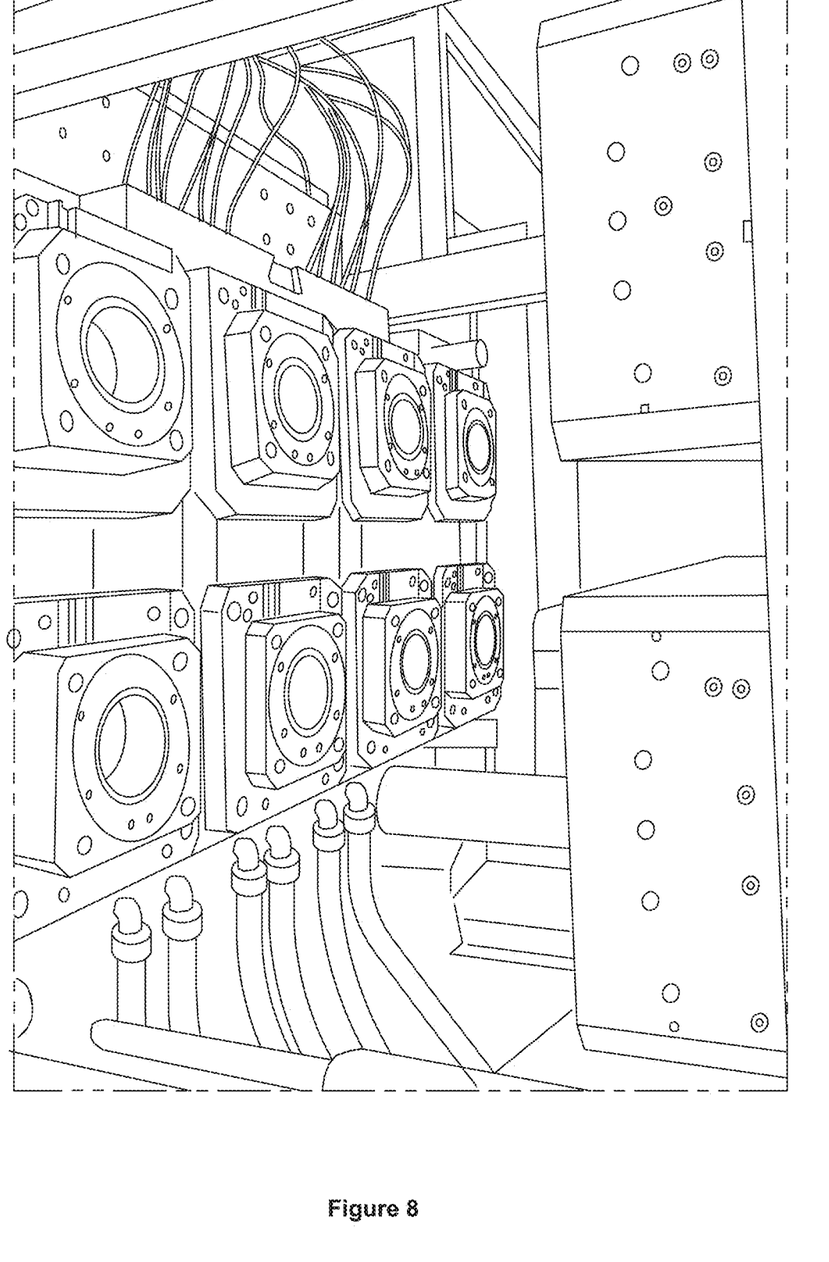

FIGS. 7 and 8 relate to an overmoulding process used to form a package of the type described in relation to FIGS. 1 to 6.

In this embodiment a package is formed by first taking a wall blank of the type shown in FIG. 5 and a base blank of the type shown in FIG. 6. The blanks are placed in female mould cavities (eight separate cavities are shown by way of example in FIG. 8).

Illustrated in FIG. 7 is: the areas 35 into which plastics material flows; the paperboard blanks 37; and areas 39 of paperboard that are compressed/under pre-tension when the male part of the mould is closed onto the female part.

When the tool is closed, the paper is compressed on well-chosen surfaces to ensure that the plastic does not extend over it in an overmoulding step. The board does not take up the entire mould; the room that remains is filled with polypropylene, so the plastics skeleton is fused to the paper carton and becomes a structural member of the product.

Also illustrated in FIG. 7 is a single limb 40 which extends radially inwardly from the lower ring of the frame. The free end of the limb is the gate point of the mould. In this embodiment this means an injection point approximately 17 mm off centre. Also shown are the tabs that depend from the upper ring.

Figure 9:
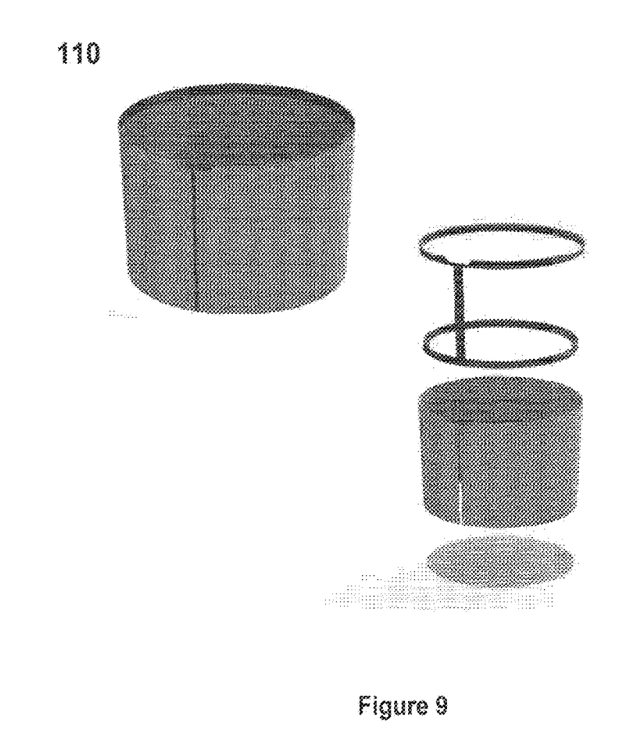

FIG. 9 shows a package 110 formed according to a further embodiment in assembled and exploded views.

Figure 10:
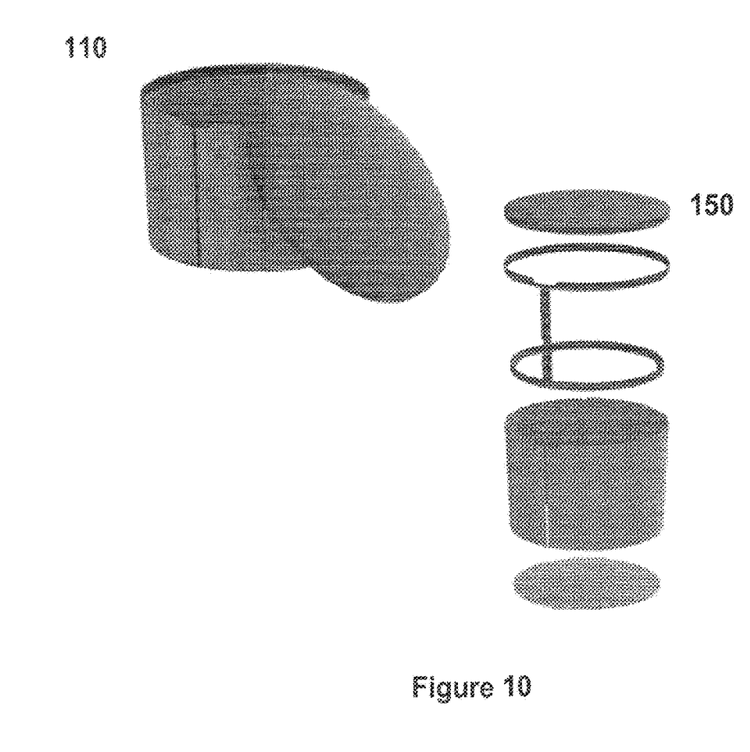

FIG. 10 shows a package 110 of the type shown in FIG. 9 and including a lid 150. The lid 150 is a push-fit/snap-fit into the upper ring of the frame.

In this embodiment the lid is formed from plastics materials. In other embodiments a mixed material lid is provided.

Figure 11:
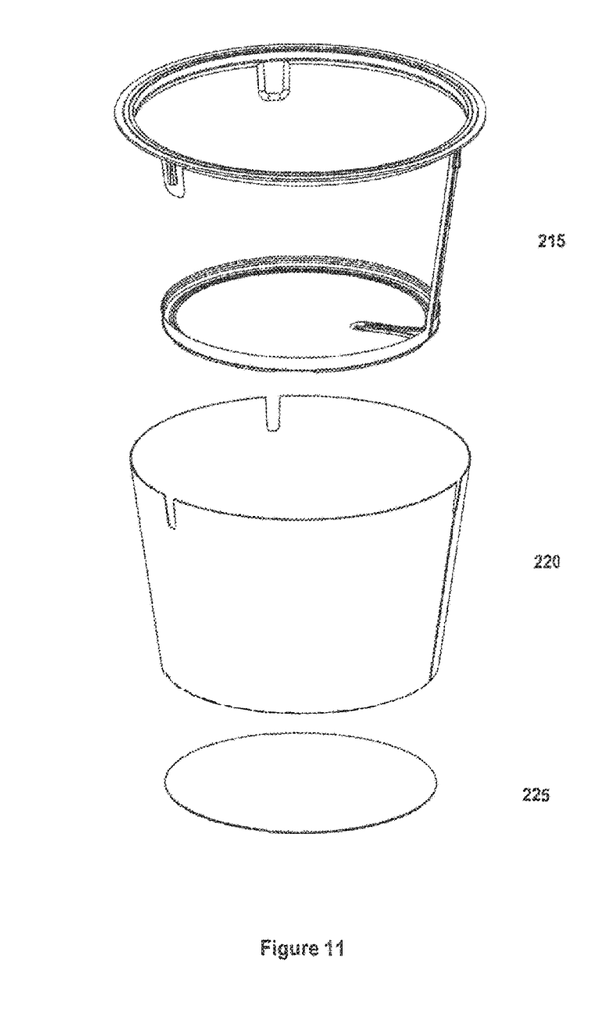
Figure 12:
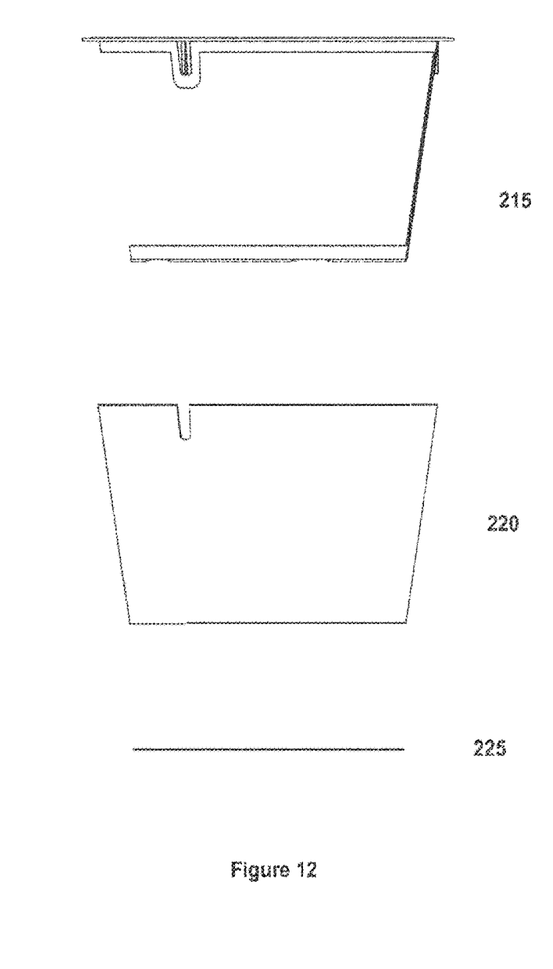
Figure 13:
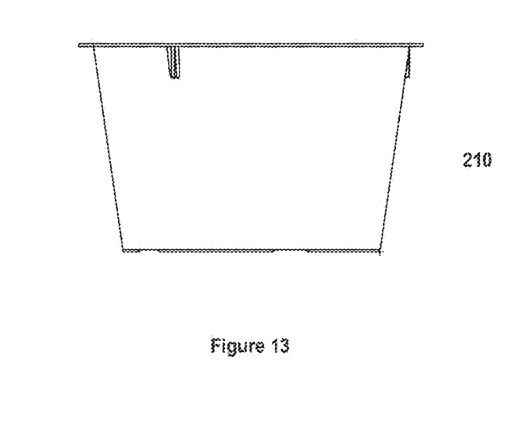
Figure 14:
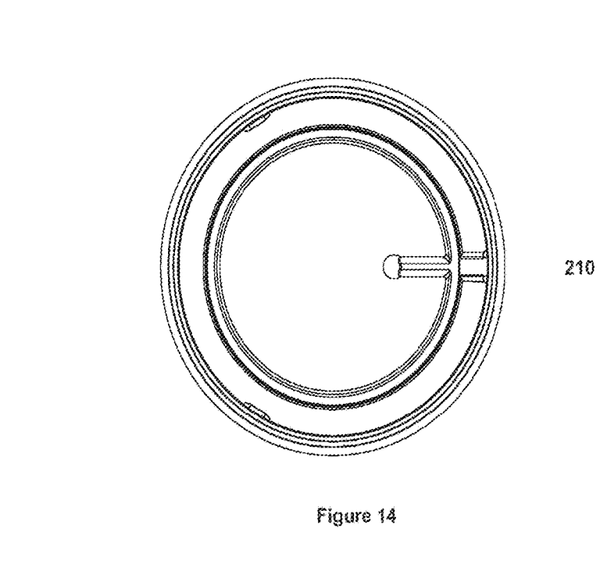
Figure 15:
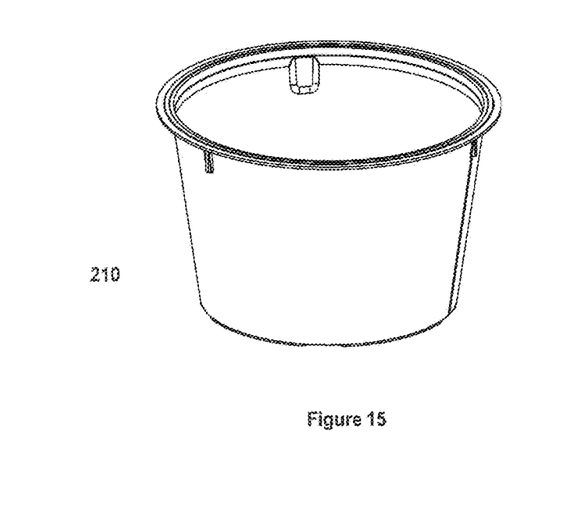
Figure 16:
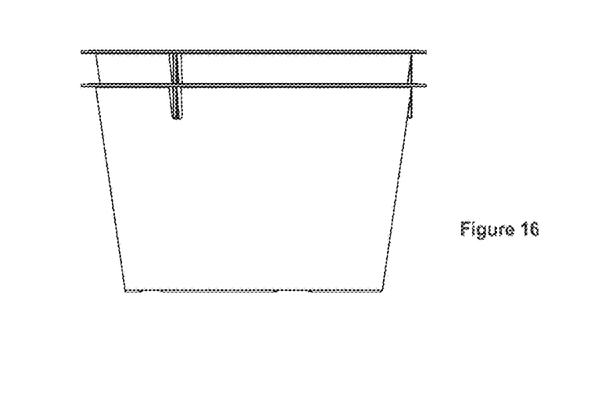
Figure 17:
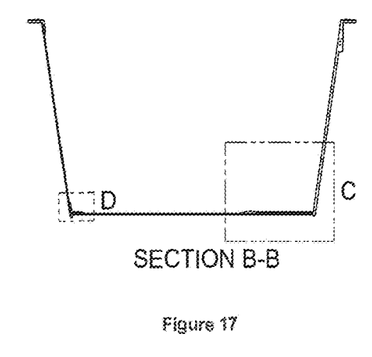
Figure 18:
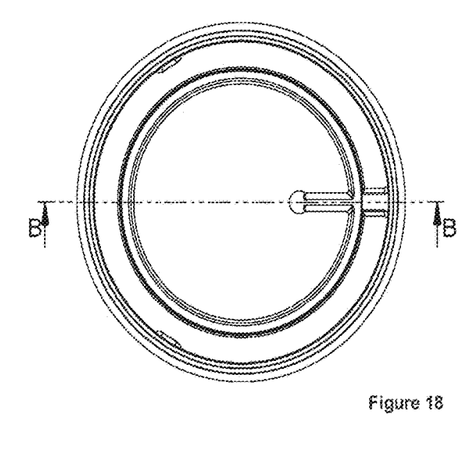
Figure 19:
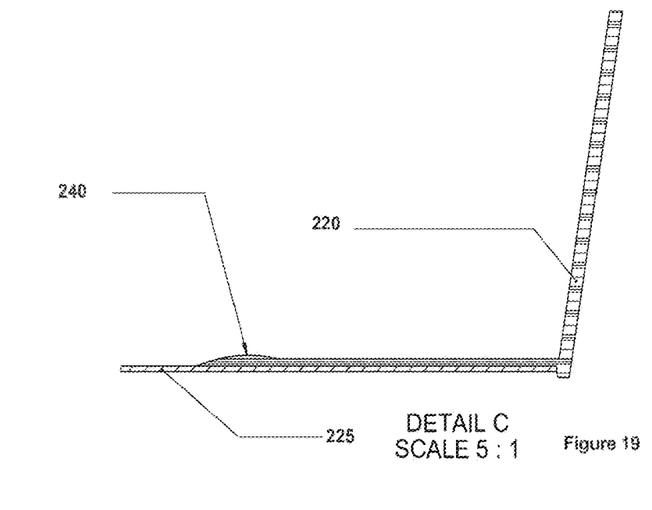
Figure 20:
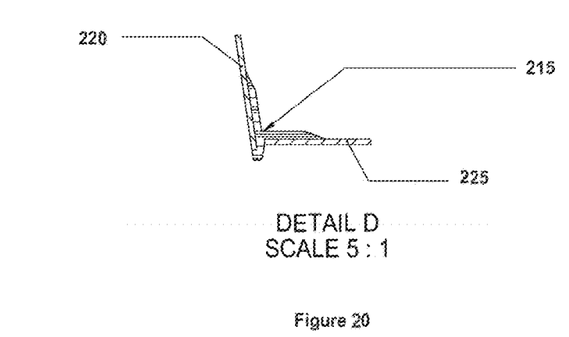

FIGS. 11 and 12 show perspective and side exploded views of a package formed according to a further embodiment. The formed package 210 is shown in FIGS. 13 to 15 and 17 to 20. Stacked packages are shown in FIG. 16.

Figure 21:
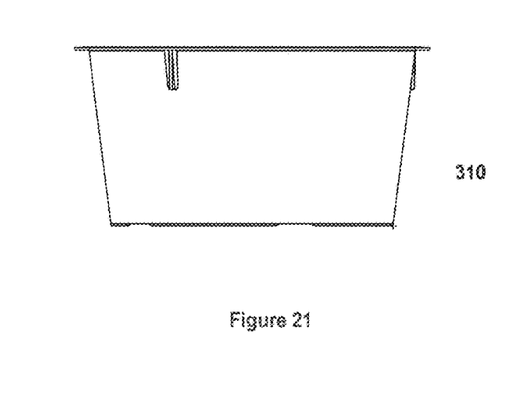
Figure 22:
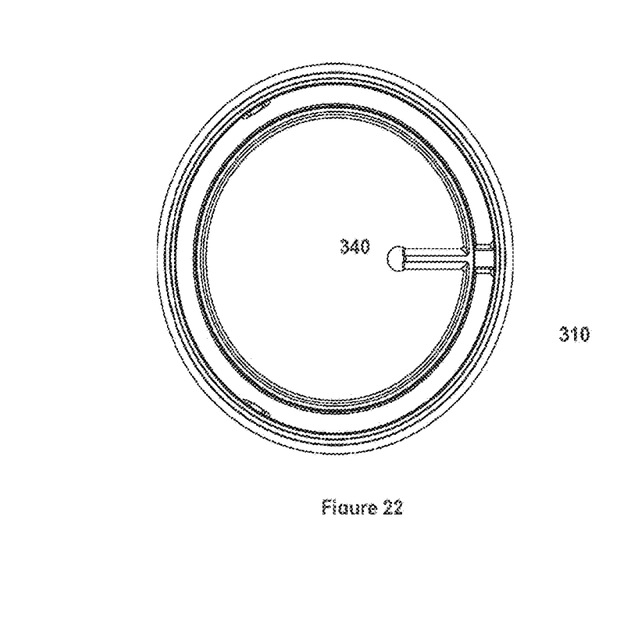
Figures 23, 24:
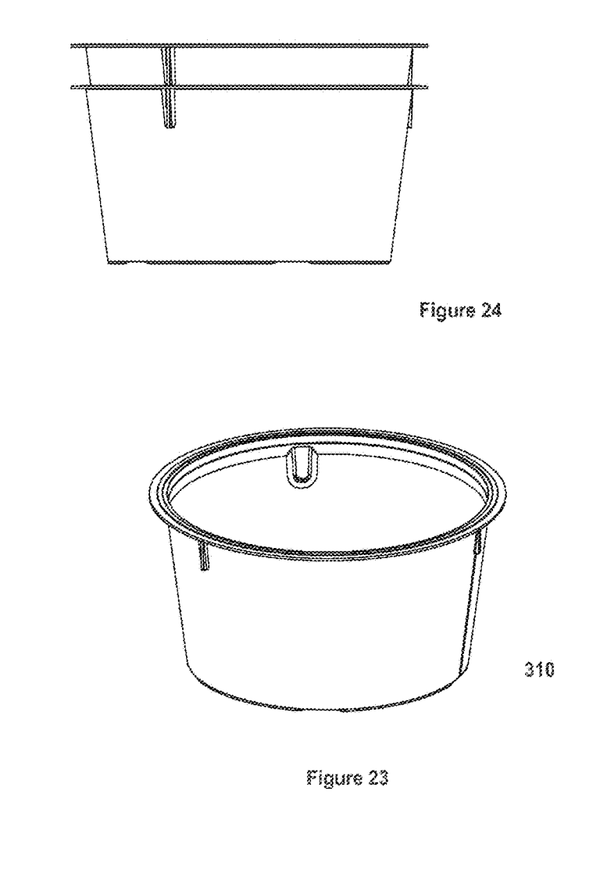

FIGS. 21 to 23 are side, plan and perspective views of a package 310 formed according to a further embodiment. FIG. 24 shows two packages of the type shown in FIGS. 21 to 23 stacked one on top of the other.

Figure 25:
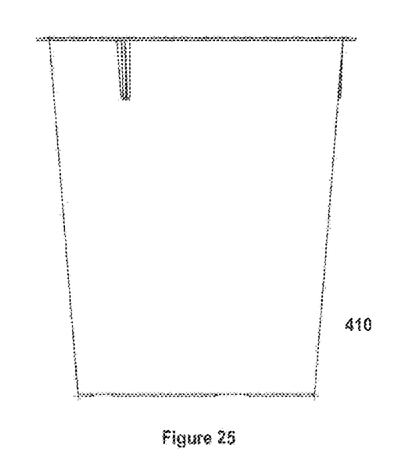
Figure 26:
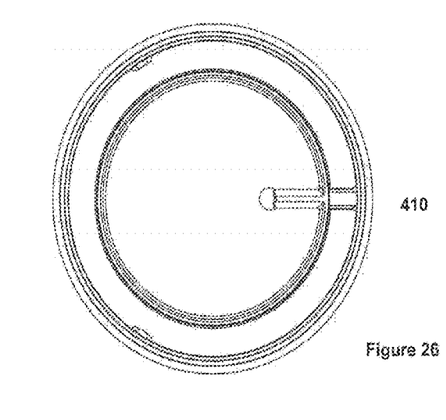
Figure 27:
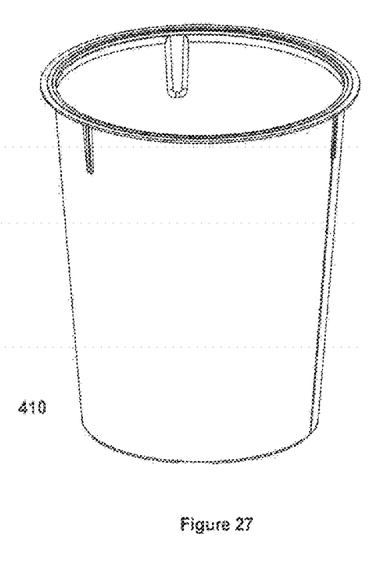
Figure 28:
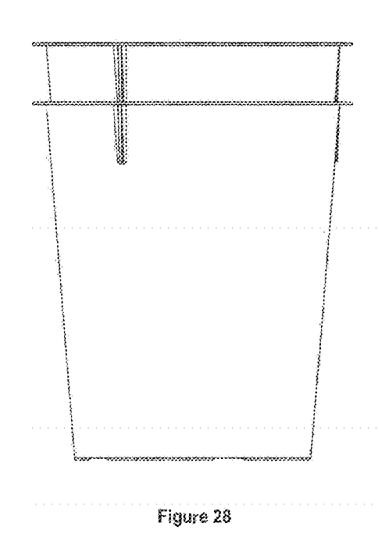
Figure 29:
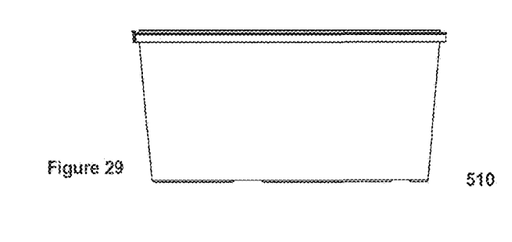
Figure 30:
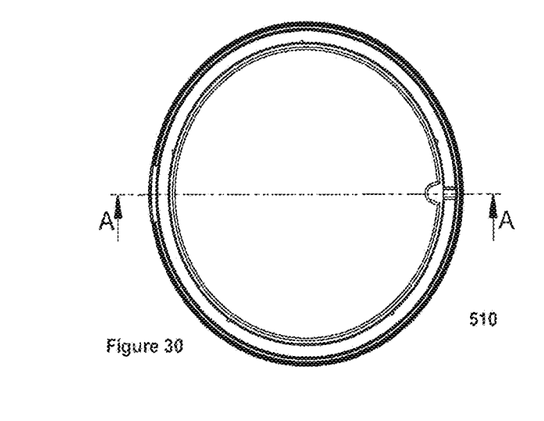

FIGS. 25 to 27 are side, plan and perspective views of a package 410 formed according to a further embodiment. FIG. 28 shows two packages of the type shown in FIGS. 25 to 27 stacked one on top of the other.

FIGS. 29 to 34 show a package 510 formed according to a further embodiment.

FIGS. 35 to 41 show a package 610 formed according to a further embodiment. In this embodiment the package is generally rectangular.

Figure 42:
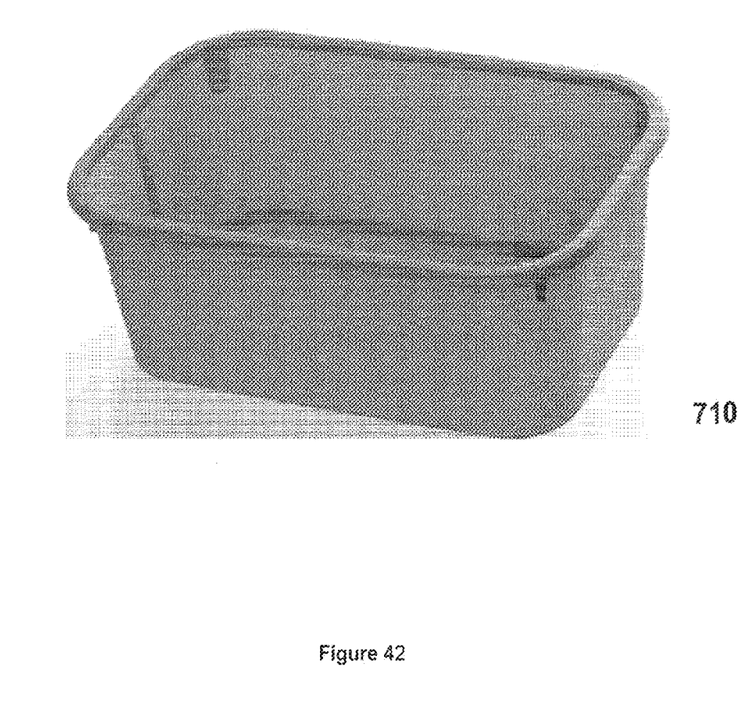
Figure 43:
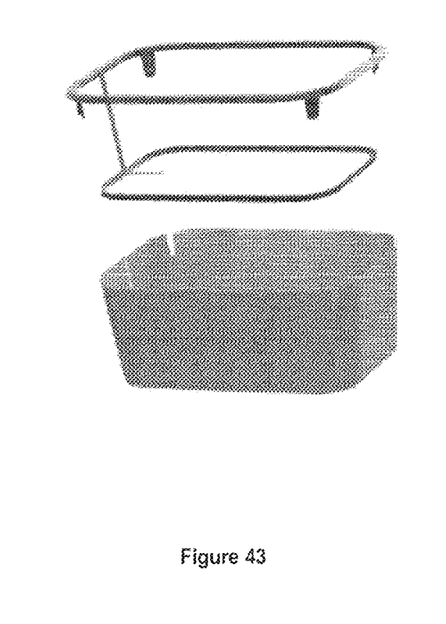

FIGS. 42 and 43 show a package 710 formed according to a further embodiment and shown in assembled and exploded views. The package is generally rectangular.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A hybrid material package comprising an injection moulded frame formed from a plastics material and a wall formed from a paper or paper-based material, the frame comprises an upper ring and a lower ring joined by a stem, the lower ring includes a single inwardly extending limb, a free end of which provides an injection point which is offset from a generally central axis of the frame for allowing overmoulding of the frame onto the wall.

2. The package as claimed in claim 1, in which the wall is formed from paperboard.

3. The package as claimed in claim 1, in which the wall is a side sleeve and the package further comprises a base.

4. The package as claimed in claim 3, in which the base comprises paper or paper-based material and/or plastic material.

5. The package as claimed in claim 1, further comprising a lid.

6. The package as claimed in claim 5, in which the lid comprises paper or paper-based material and/or plastics material.

7. The package as claimed in claim 1, in which the lower ring includes a foot on which the package rests in use.

8. The as claimed in claim 7 and including a base formed from a paper or paper-based material, in which the foot includes a step onto which the base is received.

9. The package as claimed in claim 1, in which both rings are substantially circular.

10. The package as claimed in claim 1, in which both of the rings are substantially rectangular.

11. The package as claimed in claim 1, in which the stem is axially inclined.

12. The package as claimed in claim 1, in which the upper and lower rings are concentric.

13. The package as claimed in claim 1, in which the upper ring has a larger diameter than the lower ring.

14. The package as claimed in claim 1, in which the upper ring includes depending tabs which are formed around notches in the wall.

15. The package as claimed in claim 1, in which the wall is generally frustoconical when assembled onto the frame.

16. The package as claimed in claim 1, in which the wall is formed by a flat blank that is folded into a final form.

17. A method of forming a package as claimed in claim 1, the method comprising: providing a wall formed from a paper or paper-based material; inserting the wall into a mould; and injection overmoulding a frame onto the wall.

18. The method as claimed in claim 17, in which the mould is configured such that when closed it presses onto the wall to define a boundary for subsequent material flow during overmoulding.

19. The method as claimed in claim 17, in which the material for the frame is injected using a gate which is offset from a generally central axis of the frame.

20. An overmoulding process to form a hybrid material package comprising an injection moulded frame formed from a plastics material, a side wall formed from paper or paper-based material and a base formed from paper or paper-based material, the frame comprises an upper ring and a lower ring joined by a stem, the lower ring includes a single inwardly extending limb, a free end of which provides an injection point which is offset from a generally central axis of the frame for allowing overmoulding of the frame onto the wall when the mould is closed;

the package is formed by taking a wall blank and a base blank and placing them into a female mould cavity, areas of paper or paper-based material are selected to be compressed when the male part of the mould is closed onto the female part, whereby when the mould is closed the paper or paper-based material is compressed on well-chosen surfaces to ensure that the plastics material does not extend over it in the overmoulding step, the paper or paper-based material does not take up the entire mould, the room that remains is filled with plastics material, so the plastics frame is fused to the paper or paper-based material and becomes a structural member of the package.

* * * * *